United States Patent Office 3,567,638
Patented Mar. 2, 1971

3,567,638
NOVEL PHOSPHORUS-CONTAINING ADDUCTS IN OIL COMPOSITIONS CONTAINING THE SAME
Milton Braid, Westmont, N.J., assignor to
Mobil Oil Corporation
No Drawing. Filed Sept. 26, 1968, Ser. No. 762,967
Int. Cl. C10m 1/48
U.S. Cl. 252—46.7                                   12 Claims

ABSTRACT OF THE DISCLOSURE

The reaction between diorganophosphinodithioic acids and vinyl carboxylates produces novel adducts having improved high temperature stability while imparting oxidation inhibition to organic base media.

BACKGROUND OF THE INVENTION

Field of the invention

This invention relates to novel phosphorus-containing adducts and, more particularly, it relates to reaction products of unsaturated carboxylic esters and organophosphinodithioic acids. This invention also relates to organic compositions containing minor amounts thereof.

Description of the prior art

U.S. Pat. No. 3,350,348 describes lubricant compositions containing the adduct of diorganophosphorodithioic acid and vinyl carboxylates. U.S. Pat. No. 3,143,507 describes the reaction between organophosphorodithioic acid or organophosphinodithioic acid and quinone for use in lubricants. The phosphorodithioic acid adducts of vinyl carboxylates, while they are excellent antioxidants, and leave no residue in the base medium in which they are present, may not always be stable at extreme high temperatures. An additive which can perform well in a lubricant, for example, without thermal degradation manifested as weight loss, is extremely valuable. In has hitherto been thought that adducts of the phosphorodithioate structure having the P—O—C bond, are necessary for stable antioxidant activity at high temperatures.

SUMMARY OF THE INVENTION

It has now been discovered that adducts produced by reacting a diorganophosphinodithioic acid with an unsaturated ester of the vinyl carboxylate type have improved antioxidant characteristics and better high temperature stability than related partial ester compounds. These adducts may also be referred to as 1-acyloxyalkyl phosphinodithioates. Organic compositions containing a minor proportion of these adducts as the additive are provided with excellent antioxidant protection.

DESCRIPTION OF SPECIFIC EMBODIMENTS

The novel additives of this invention have the formula $$\left[ \begin{array}{c} (R) \\ \diagdown \\ \diagup \\ (R') \end{array} \!\!\! \overset{S}{\underset{}{\overset{\uparrow}{P}}}\!\!-S-CH-O-\overset{O}{\underset{}{\overset{\|}{C}}}\!\!-\!\!\!\underset{\underset{R'''}{|}}{\underset{CH_2}{|}}\!\!\!-R'' \right]_n$$

wherein the R and R' groups are hydrocarbyl radicals or hydrocarbyl radicals containing substituents of halogen, sulfur, oxygen, hydroxy, cyano, nitro, amino and ether, including hydrocarbyloxy, hydrocarbylthio, hydrocarbylamino and dihydrocarbylamino, and they may be the same or different; n is an integer of from 1 to 2; R'' may be hydrogen, or a monovalent hydrocarbyl group when n is 1, or a divalent hydrocarbyl group when n is 2 and may contain the same substituent groups as R and R'; and R''' is hydrogen or a hydrocarbyl group.

More specifically, R and R' include alkyl, cycloalkyl, alkenyl, aryl, or alkaryl, and any of the aforesaid halogen, sulfur, oxygen, hydroxy, cyano, nitro, amino or ether derivatives thereof. R contains from 1 to about 30 carbon atoms. The most preferred compounds of this invention are those in which either both R and R' are aryl or alkaryl, and particularly phenyl, naphthyl, tolyl, or R is aryl and R' is alkyl, e.g. phenyl with methyl, ethyl, butyl, and so on.

The diorganophosphinodithioic acid $$\begin{array}{c} (R) \\ \diagdown \\ \diagup \\ (R') \end{array} \!\!\! \overset{S}{\underset{}{\overset{\uparrow}{P}}}\!\!-SH$$

is reacted with an unsaturated ester of the vinyl carboxylate type to produce the adduct. A reaction of this nature is reacted with an unsaturated ester of the vinyl carboxylvinyl carboxylate has the structure $$\left[ R'''-CH=CH O \overset{O}{\underset{}{\overset{\|}{C}}}\!\!-R'' \right]_n$$

R'' specifically may include hydrogen, alkyl, cycloalkyl, aralkyl, aryl and alkaryl, when n is 1; and alkylene, cycloalkylene, aralkylene, arylene and alkarylene, when n is 2. Preferably, R'' contains from 1 to about 20 carbon atoms. Halogen derivatives of R'' are also suitable. R'''—CH= is an alkylidene or aralkylidene group which upon reaction with the phosphinodithioic acid is converted to the corresponding alkyl or aralkyl group defined as

R'''—CH$_2$— above. R''' is preferably hydrogen or hydrocarbyl having from 1 to about 20 carbon atoms and may include alkyl, aralkyl, cycloalkyl, aryl and alkaryl groups.

The diorganophosphinodithioic acid may be produced by reaction of a secondary organophosphine with sulfur in ether to yield the acid or in an inorganic basic solution to produce the corresponding salt, e.g. ammonium or sodium, which on acidification yields the acid. Another method involves the reaction between $P_4S_{10}$ and an aromatic hydrocarbon, in the presence of a Friedel-Crafts catalyst, such as $AlCl_3$. Mixed diorganophosphinodithioic acids can be prepared by reacting an aromatic hydrocarbon with a dimeric thionophosphine sulfide, as follows:

$$[RPS_2]_2 + 2C_6H_6 \xrightarrow{AlCl_3} 2R(C_6H_5)P(S)SH$$

The reaction between Grignard reagents and the phosphorus sulfides and the cleavage of tetra-organobiphosphine disulfides, $R_2P(S)=(S)PR_2$, with a Group II metal and sulfur represent yet other means of obtaining the acids used in this invention. These reaction sequences are known in the art.

The specific organic groups illustrating the preferred aspect of this invention are those in which each R may be alkyl, cycloalkyl, aralkyl, alkenyl, alkoxyalkyl, aryloxyalkyl, haloalkyl, alkylaminoethyl, and the other group discussed previously, such as methyl, ethyl, butyl, octyl, decyl, octadecyl, eicosyl, cyclopentyl, cyclohexyl, methyl cyclohexyl, benzyl, chloroethyl, chlorobutyl, bromobutyl, methoxyethyl, ethylaminoethyl, cyanoethyl and the like; and aryl, diaryl, alkaryl, haloaryl, nitroaryl, and others, such as phenyl, tolyl, ethylphenyl, chlorophenyl, bromophenyl, nitrophenyl, naphthyl, chloronaphthyl, and the like.

The vinyl carboxylates used in this invention may include the vinyl esters of acetic acid, propionic acid, butyric acid, pentanoic acid, caproic acid, caprylic acid, capric acid and other aliphatic acids containing up to 20 carbon atoms, including the branched aliphatic acids, such as isobutyric. Cyclic, non-aromatic acids may include cyclohexyl monocarboxylic acid, the naphthenic acids and others of similar nature. The aromatic esters include benzoic acid, naphthoic acid, and alkyl, halogen, or other substituted derivatives thereof. The vinyl carboxylate esters used in this invention may also include the divinyl esters of dicarboxylic acids. These acids include oxalic acid, malonic acid, succinic acid, pimelic acid, and the cyclohexane dicarboxylic acids. Unsaturated acids include maleic acid, fumaric acid, and acrylic acid. The aromatic dicarboxylic acids include, for example, phthalic and terephthalic acids. If desired, the monovinyl ester of dicarboxylic acids may be used. In such case, R'' could contain a carboxyl group which is preferably substituted by an ester, amide, or metal salt linkage prior to use in the base medium.

In a typical reaction for preparing the additives of this invention, the phosphinodithioic acid is added gradually and with stirring to the vinyl carboxylate. The temperature of the addition may range from 40° to 150° C. Although equimolar amounts may be used, that is, one mole of the acid per double bond of the ester, it is preferred to use an excess amount of the vinyl ester. The reaction sequence is as follows (in the case of $n$ being 1, and R and R' being the same):

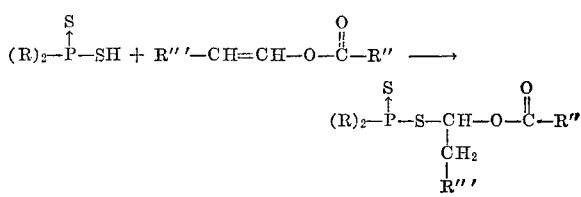

wherein R, R'' and R''' have the aforementioned definitions.

When the reactants have been combined, the temperature of the reaction mass is ordinarily held in that range until reaction is complete. Generally, the total reaction time takes from about 30 minutes to 5 hours, most often from 1 to about 2 hours.

The reaction is preferably carried out in a liquid phase. If necessary, an organic solvent inactive in the reaction is added. Such solvents include benzene, toluene, heptane, cyclohexane, and the like, or any of the known solvent-refined processing oils. At the end of the reaction, the excess vinyl carboxylate is removed, if necessary, by vacuum distillation. If an organic solvent has been added, this too may be removed by distillation. The remaining product is usually in the form of an oil-soluble liquid. If the product is to be used as an additive in a lubricating composition, and a process oil is used as the reaction solvent, then this oil may be allowed to remain in the product for subsequent addition to the final oil composition. As disclosed earlier, the temperature for the reaction may be held at a moderate level, and is preferably from about 45° C. to about 90° C.

The diorganophosphinodithioic acid adducts of the vinyl carboxyaltes prepared in accordance with this invention have excellent solubility in organic base media. These adducts may be employed as antioxidants in lubricating oil, such as mineral oils, or synthetic oils. The synthetic oils include the long chain hydrocarbon fluids, olefin derived fluids, synthetic ester fluids, silicone fluids, polyphenyl ethers, polyacetals, and so forth. Of particular interest are the synthetic ester fluids derived from polyhydric alcohols, i.e., neopentyl glycol, trimethylolpropane and pentaerythritol, and monocarboxylic acids having from 2 to about 20 carbon atoms; and olefin derived fluids, such as polydecene fluids, and the like. The adducts in this invention may also have utility in liquid hydrocarbon fuels, such as gasoline and kerosene. Moreover, many organic plastic products require protection from oxidation; these include polyvinyl and polystyrene polymers, natural rubber, rubbers produced from olefins, such as polybutadienes, and the like. The concentration of the adducts of this invention may range from about 0.01% by weight to about 10% and preferably from about 0.05% to about 2%.

The following examples and test results illustrate the typical manner of carrying out and utilizing the invention.

EXAMPLE 1

Into a reaction flask equipped with a thermometer, stirrer and condenser, was added 45 grams (0.522 mole) of vinyl acetate, in 100 ml. of toluene. To the flask was then added with stirring, 75 grams (0.299 mole) of diphenylphosphinodithioic acid. The temperature ranged from 80° to 90° C. over the 1.5-hour addition-reaction period. At the end of the reaction period, the reaction mixture was heated under vacuum to remove excess vinyl acetate and toluene. The yield of the crude liquid product was 79%.

Analysis.—Calc'd (percent): P, 9.23; S, 19.1. Found (percent): P, 9.45; S, 19.9.

After washing with 20% sodium carbonate solution and drying:

Found (percent): P, 9.13; S, 19.6.

EVALUATION OF PRODUCT

The product of Example 1 was evaluated in typical tests showing additive performance in the lubricating oil compositions.

(A) Oxidation stability test: In this test, the product is added to the mineral lubricating oil at various concentrations. The oil composition is heated to 325° F. and dry air is passed through it at the rate of about 5 liters per hour. Present in the oil sample are iron, copper, aluminum and lead specimens. After 40 hours of this treatment, the oil sample is subjected to analysis to determine the increase in the neutralization number, as measured by the ASTM D-974 method, the percent of increase in the kinematic viscosity at 210° F. and the amount of loss of the lead specimen. As representative of the additives of this invention, the washed product of Example 1 gave the following results:

| | NN increase | Percent KV increase at 210° F. | Lead loss, mg. |
|---|---|---|---|
| Additive concentration, percent by wt.: | | | |
| 0.86 | 1.6 | 6 | 1.9 |
| 0.43 | 3.6 | 19 | 0.2 |
| 0.22 | 13.2 | 85 | 37.4 |
| No additive | 19.5 | 374 | |

(B) Bearing corrosion test: In this test, a sample oil composition is used to lubricate a copper-lead bearing in a one-cylinder CRC L-38 test engine run for 40 hours. The engine speed is about 3150 r.p.m., and the oil temperature may be as high as 290° C. The test lubricant consisted of a solvent-refined mineral oil containing 1% by weight of the additive of Example 1 and 3% of a boron-containing ashless detergent. The bearing is weighed before and after the run. If there is a loss of weight of the bearing of over 50 mg., the lubricating oil composition is deemed to have failed. The results of the engine run are as follows:

Bearing weight loss, mg.
Top surface _____ 16
Bottom surface _____ 17
  Total _____ 33

Bearing surface rating: [1]A
Piston rating: 9.8 (10=optimum)
Sludge rating: 10.0 (10=optimum)

[1] A: Smooth, bright, unstained bearing surface.

(C) Thermogravimetric test: This test investigates the stability of an additive at high temperatures. The additive is subjected to increasing heat while the rate of weight loss is observed. The temperature at which the rate of weight loss is markedly increased is designated as the inflection temperature; hence, a high inflection temperature indicates substantial high temperature stability. The temperature is increased above the inflection temperature to determine the weight lost above the critical level; the lower the loss of weight, the more stable is the additive considered to be. The diphenylphosphinodithioic acid-vinyl acetate adduct is compared with the diphenylphosphorodithioic acid-vinyl acetate adduct. Both adducts had been prepared by similar reactions. The following results were obtained:

| Adduct | Inflection temp., °C. | Percent weight loss at— | | |
|---|---|---|---|---|
| | | 200° C. | 300° C. | 400° C. |
| Diphenylphosphinodithioic acid adduct | 190 | 4 | 25 | 39 |
| Diphenylphosphorodithioic acid adduct | 180 | 7.2 | 27.0 | 53.3 |

The results from these evaluation tests indicate that although both products have high resistance to high temperatures, the diorganophosphinodithioic acid adducts of the vinyl carboxylates are better suited to withstand the extreme temperatures often reached in the use of organic base media, such as lubricating oil compositions, than the corresponding diorganophosphorodithioate adducts.

EXAMPLE 2

Employing the same reaction conditions as in Example 1, the mixed organic acid, butyl(phenyl)phosphinodithioic acid and vinyl acetate are reacted together. Excess vinyl acetate and toluene are removed from the resulting adduct.

EXAMPLE 3

Employing the same reaction conditions as in Example 1, diphenylphosphinodithioic acid is reacted with vinyl benzoate. At the end of the reaction, excess vinyl benzoate and toluene are removed from the resulting adduct.

EXAMPLE 4

Employing similar reaction conditions to Example 1, dihexylphosphinodithioic acid is reacted with divinyl succinate in sufficient amounts of each reactant to obtain the complete addition reaction. Excess vinyl succinate is present as in the previous examples. The unreacted succinate and toluene are removed from the resulting adduct.

The products of this invention are compatible with other typical additives useful for providing other performance characteristics, including detergents, extreme pressure additives, pour point depressants, and the like.

The above disclosure contains specific embodiments illustrating the present invention which, in its broadest aspect, covers obvious modifications to one skilled in the art; these embodiments should therefore not be deemed limitations of the invention except where expressly stated and as limited by the following claims:

I claim:
1. An organic composition comprising a major proportion of a lubricating oil normally susceptible to oxidation deterioration and an amount sufficient to reduce said deterioration of a 1-acyloxyalkyl diorganophosphinodithioate of the formula

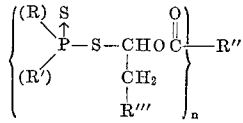

wherein R and R' contain from 1 to about 30 carbon atoms and are individually selected from the group consisting of alkyl, cycloalkyl, aryl, alkaryl and the halogen, hydroxy, nitro, cyano, amino and alkoxy derivatives thereof, R" is selected from the group consisting of hydrogen and R when $n$ is 1, and when $n$ is 2 R" is selected from the group consisting of alkylene, cycloalkylene, aralkylene, arylene, alkarylene and the halogen, hydroxy, nitro, cyano, amino and alkoxy derivatives thereof R''' is selected from the group consisting of hydrogen and R, and $n$ is an integer of from 1 to 2.

2. The composition of claim 1 wherein R" contains from 1 to about 20 carbon atoms.

3. The composition of claim 2 wherein R" is selected from the group consisting of hydrogen, alkyl, cycloalkyl, aryl, and alkaryl and $n$ is 1.

4. The composition of claim 2 wherein R" is selected from the group consisting of alkylene, cycloalkylene, arylene and alkarylene, and $n$ is 2.

5. The composition of claim 4 wherein R''' is a hydrocarbyl group containing from 1 to about 20 carbon atoms.

6. The composition of claim 5 wherein R''' is selected from the group consisting of alkyl and aralkyl.

7. The composition of claim 1 wherein at least one organo group is aryl.

8. The composition of claim 7 wherein the compound is 1-acyloxyalkyl diarylphosphinodithioate.

9. The composition of claim 8 wherein the compound is S-(1-acetoxyethyl) diphenylphosphinodithioate.

10. The composition of claim 7 wherein the lubricating oil is a mineral lubricating oil.

11. The composition of claim 7 wherein the lubricating oil is a synthetic lubricating oil.

12. The composition of claim 11 wherein the synthetic lubricating oil is selected from the group consisting of an ester oil and an olefin-derived hydrocarbon oil.

References Cited
UNITED STATES PATENTS

| | | | |
|---|---|---|---|
| 2,875,228 | 2/1959 | Birum | 252—46.6X |
| 3,020,306 | 2/1962 | Birum | 252—46.6X |
| 3,143,507 | 8/1964 | Mastin et al. | 252—46.6 |
| 3,350,348 | 10/1967 | Braid et al. | 252—46.6 |

DANIEL E. WYMAN, Primary Examiner

W. CANNON, Assistant Examiner

U.S. Cl. X.R.

252—46.6, 400; 260—952; 44—76

PO-1050
(5/69)

UNITED STATES PATENT OFFICE
CERTIFICATE OF CORRECTION

Patent No. 3,567,638               Dated March 2, 1971

Inventor(s) MILTON BRAID

It is certified that error appears in the above-identified patent and that said Letters Patent are hereby corrected as shown below:

In column 1, line 39, "In" should be -- It --. In column line 17, delete "reacted with an unsaturated ester of the vinyl carboxyl-" and substitute -- described in detail in U.S. Patent No. 3,350,348. The --. In column 3, line 57, "carboxyaltes" should be -- carboxylates --.

Signed and sealed this 17th day of August 1971.

(SEAL)
Attest:

EDWARD M. FLETCHER, JR.            WILLIAM E. SCHUYLER,
Attesting Officer                  Commissioner of Pate